United States Patent
Dwyer (10) Patent No.: US 10,161,956 B2
(45) Date of Patent: Dec. 25, 2018

(54) REDUCING BIAS IN AN ACCELEROMETER VIA A POLE PIECE

(71) Applicant: Honeywell International Inc., Morris Plains, NJ (US)

(72) Inventor: Paul W. Dwyer, Seattle, WA (US)

(73) Assignee: Honeywell International Inc., Morris Plains, NJ (US)

( * ) Notice: Subject to any disclaimer, the term of this patent is extended or adjusted under 35 U.S.C. 154(b) by 298 days.

(21) Appl. No.: 15/137,409

(22) Filed: Apr. 25, 2016

(65) Prior Publication Data

US 2017/0307653 A1 Oct. 26, 2017

(51) Int. Cl.
| | | |
|---|---|---|
| G01P 15/125 | (2006.01) |
| G01P 15/13 | (2006.01) |
| G01P 15/08 | (2006.01) |

(52) U.S. Cl.
CPC .......... G01P 15/125 (2013.01); G01P 15/132 (2013.01); *G01P 2015/0828* (2013.01)

(58) Field of Classification Search
CPC .................................................. G01P 15/125
See application file for complete search history.

(56) References Cited

U.S. PATENT DOCUMENTS

| | | |
|---|---|---|
| 4,088,027 A | 5/1978 | Hernandez et al. |
| 4,726,228 A | 2/1988 | Norling |
| 4,808,895 A | 2/1989 | Fujita et al. |
| 4,944,184 A | 7/1990 | Blake et al. |
| 5,184,055 A | 2/1993 | Ohishi et al. |
| 5,343,766 A | 9/1994 | Lee |
| 5,488,865 A | 2/1996 | Peters |
| 5,524,488 A | 6/1996 | Foote |
| 5,532,665 A | 7/1996 | Foote et al. |
| 5,587,530 A | 12/1996 | Foote et al. |
| 5,952,575 A | 9/1999 | Foote |
| 6,335,845 B1 | 1/2002 | Yamaguchi et al. |
| 6,685,143 B1 | 2/2004 | Prince et al. |
| 6,776,042 B2 | 8/2004 | Pike et al. |

(Continued)

FOREIGN PATENT DOCUMENTS

| | | |
|---|---|---|
| EP | 1177451 B1 | 3/2000 |
| GB | 2006439 A | 5/1979 |

(Continued)

OTHER PUBLICATIONS

Extended Search Report from counterpart European Application No. 17163451.2, dated Sep. 9, 2017, 8 pp.

(Continued)

*Primary Examiner* — Lisa Caputo
*Assistant Examiner* — Herbert K Roberts
(74) *Attorney, Agent, or Firm* — Shumaker & Sieffert, P.A.

(57) ABSTRACT

An accelerometer includes an upper stator, a lower stator, and a proof mass assembly disposed between the upper and the lower stator. At least one of the upper stator or the lower stator includes an excitation ring, a magnet coupled to the excitation ring, and an asymmetric pole piece coupled to a top surface of the magnet. The asymmetric pole piece covers at least a portion of the top surface of the magnet such that a center of magnetic flux associated with the at least one of the upper stator or the lower stator is aligned with a center of mass of the proof mass assembly.

13 Claims, 6 Drawing Sheets

(56) References Cited

U.S. PATENT DOCUMENTS

| | | |
|---|---|---|
| 6,904,805 B2 | 6/2005 | Joseph et al. |
| 7,100,447 B2 | 9/2006 | Dwyer |
| 7,191,654 B2 | 3/2007 | Dwyer et al. |
| 7,926,348 B2 | 4/2011 | Dwyer |
| 8,730,772 B1 | 5/2014 | Neos |
| 8,800,371 B2 | 8/2014 | Chen et al. |
| 8,919,201 B2 | 12/2014 | Koyama et al. |
| 9,140,822 B2 | 9/2015 | Senkoji et al. |
| 9,164,117 B2 | 10/2015 | Roehnelt et al. |
| 2008/0068603 A1 | 3/2008 | Nawata et al. |
| 2009/0205424 A1 | 8/2009 | Roehnelt et al. |
| 2010/0083759 A1* | 4/2010 | Dwyer ............... G01P 15/132 73/514.31 |
| 2010/0244164 A1 | 9/2010 | Roehnelt |
| 2015/0060593 A1 | 5/2015 | Prince et al. |

FOREIGN PATENT DOCUMENTS

| | | |
|---|---|---|
| JP | 5090266 B2 | 9/2012 |
| WO | 9119988 A1 | 12/1991 |

OTHER PUBLICATIONS

Godler et al., "Stability, Gain and SamplingTime of the Discrete Time Acceleration Control Loop," Industrial Electronics, IEEE, Jan. 2001, 4 pp.

Response to Extended Search Report dated Nov. 7, 2017, from counterpart European Application No. 17163451.2, filed Apr. 23, 2018, 11 pp.

* cited by examiner

REDUCING BIAS IN AN ACCELEROMETER VIA A POLE PIECE

TECHNICAL FIELD

The disclosure relates to accelerometers.

BACKGROUND

Accelerometers function by detecting the displacement of a proof mass under inertial forces. An accelerometer assembly may, for example, detect the displacement of a proof mass by a capacitive pick-off system. In this example, a capacitor pick-off plate may be deposited on the upper surface of the proof mass, and a similar capacitor pick-off plate may be deposited on the lower surface of the proof mass. The capacitor plates cooperate with the inwardly facing surfaces of upper and lower stators to provide the capacitive pick-off system. Additionally, a force-rebalancing system may be used to detect the displacement of the proof mass, where coil forms with force-rebalancing coils are mounted on either side of the proof mass. The force-rebalancing coils cooperate with permanent magnets in the upper and lower stators and with a suitable feedback circuit to retain the proof mass at a predetermined position (i.e., a null position) with respect to the support structure. Acceleration applied to the accelerometer assembly may be determined based on the change in capacitance with respect to the capacitor pick-off plates or the current increase in the force-rebalancing coils to maintain the proof mass in the null position.

SUMMARY

In one example, an accelerometer includes an upper stator, a lower stator, and a proof mass assembly disposed between the upper and the lower stator. At least one of the upper stator or the lower stator includes an excitation ring, a magnet coupled to the excitation ring, and an asymmetric pole piece coupled to a top surface of the magnet. The asymmetric pole piece covers at least a portion of the top surface of the magnet such that a center of magnetic flux associated with the at least one of the upper stator or the lower stator is aligned with a center of mass of the proof mass assembly.

In another example, a method includes forming a stator for an accelerometer, wherein the stator comprises an excitation ring, a magnet, and an asymmetric pole piece. Forming the stator may include coupling the magnet to the excitation ring and coupling the asymmetric pole piece to a top surface of the magnet. Coupling the asymmetric pole piece to the top surface of the magnet includes covering at least a portion of the top surface of the magnet with the asymmetric pole piece, such that a center of magnetic flux associated with the at least one of the upper stator or lower stator is aligned with a center of mass of the proof mass assembly.

The details of one or more examples of the disclosure are set forth in the accompanying drawings and the description below. Other features, objects, and advantages of the disclosure will be apparent from the description and drawings, and from the claims.

DETAILED DESCRIPTION

Navigation systems and positioning systems rely on the accuracy of accelerometers to perform operations. The accuracy of some accelerometers may be limited by hysteresis and bias instabilities (e.g., a change in the physical structure of the accelerometer assembly) caused by physical or thermal strains. For example, bias instabilities may be created during the construction process of the accelerometer or during operation of the accelerometer. An accelerometer may include a proof mass assembly coupled to an upper stator and a lower stator. An outer ring of the stators, also referred to as an excitation ring, may be manufactured to be asymmetric (e.g., by removing a cutout in the excitation ring) in order to align the center of magnetic flux of the stators with the center of mass of the proof mass assembly. However, by removing a portion of the excitation ring, the top surface of the excitation rings may not be flat, which may cause the proof mass to bend when the stators are clamped to the proof mass. A bend in the proof mass may produce a bias in the output that is not proportional to the acceleration, which may cause an error in the acceleration measurement.

This disclosure describes an accelerometer that includes a stator which includes a magnet and an asymmetric pole piece coupled to a magnet. The asymmetry of the pole piece may cause the center of magnetic flux of the stator to better align with the center of mass of the proof mass compared to existing accelerometers. By using an asymmetric pole piece rather than removing a portion of the excitation ring, the described techniques may enable the excitation ring to be manufactured with a flatter top surface compared to a top surface of some excitation rings. By creating a flatter top surface of the excitation ring, the techniques and devices disclosed herein that may reduce the bias of the accelerometer, which may enable the accelerometer to more accurately determine the acceleration.

Figure 1:
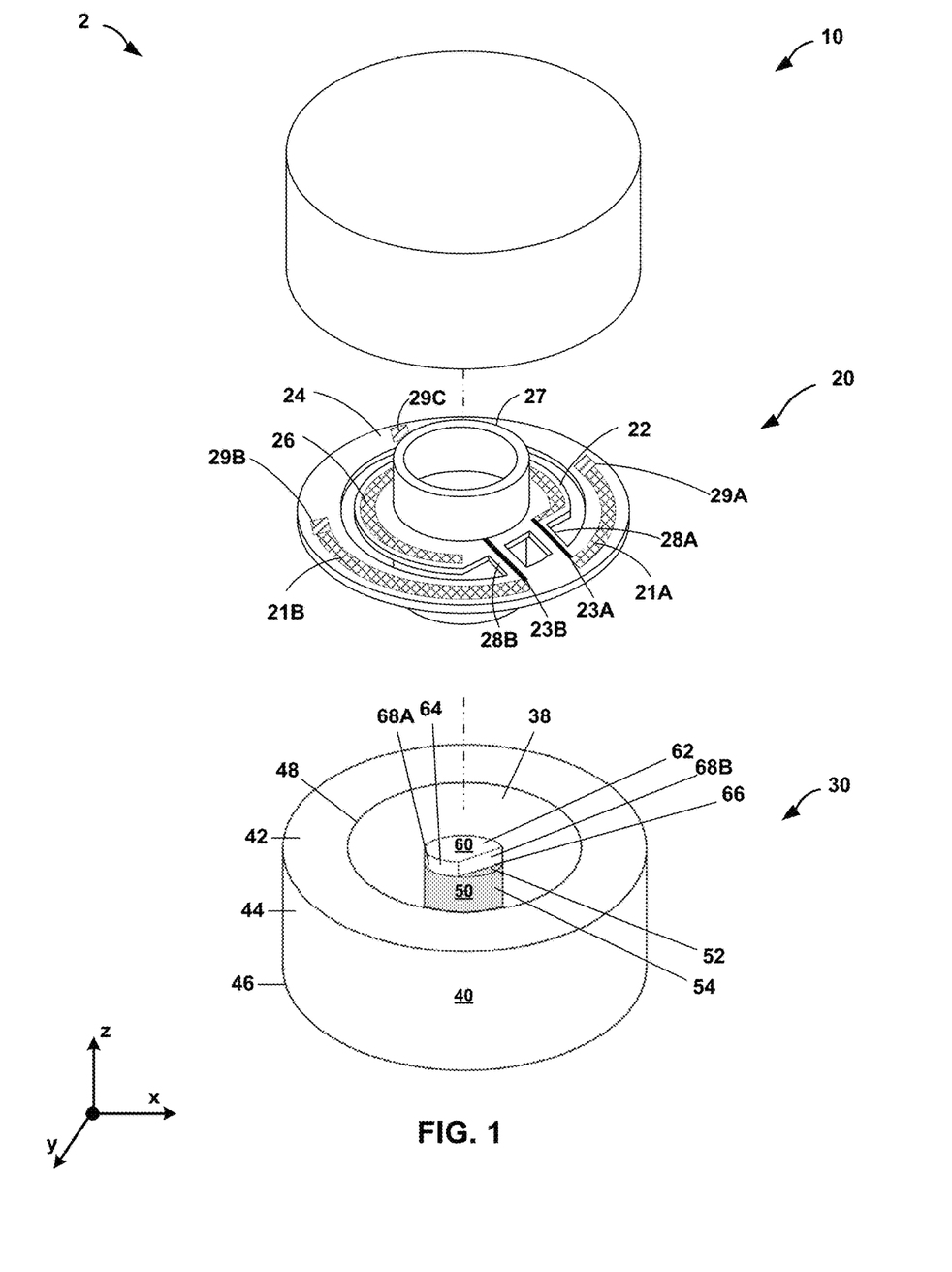
FIG. 1 is a conceptual diagram illustrating an exploded view of an example accelerometer, in accordance with one or more aspects of the disclosure.

FIG. 1 is a conceptual diagram illustrating an exploded view of an example accelerometer 2, in accordance with one or more aspects of the disclosure. In some examples, accelerometer 2 (e.g., a force rebalance accelerometer) includes an upper stator 10, a lower stator 30 (e.g., collectively, "upper and lower stators 10 and 30"), and a proof mass assembly 20 disposed between upper and lower stators 10 and 30. In some examples, proof mass assembly 20 may include a proof mass 22, a support structure 24, and a first flexure 28A and a second flexure 28B (collectively, "flexures 28") flexibly connecting proof mass 22 to support structure 24. Proof mass 22 may include an upper and lower capacitance pick-off plates (only upper capacitance pick-off plate 26 is shown in FIG. 1) and an upper and lower force-rebalance coils (only upper force-rebalance coil 27 is shown in FIG. 1) mounted on the major surfaces of proof mass 22 and configured to interact with upper and lower stators 10 and 30.

Support structure 24 of proof mass assembly 20 may provide structural support for proof mass 22 and help maintain the separation between proof mass 22 and upper and lower stators 10 and 30. In some examples, support structure 24 may define a plane in which proof mass 22 and flexures 28 are located. For example, support structure 24 may be in a form of a planar ring structure that substantially surrounds proof mass 22 and substantially maintains flexures 28 and proof mass 22 in a common plane (e.g., an xy-plane). Although support structure 24 is shown as a circular shape, it is contemplated that support structure 24 may be any shape (e.g., square, rectangular, oval, or the like) and may or may not surround proof mass 22. Support structure 24 may be formed using any suitable material. In some examples, support structure 24 may be made of fused quartz (SiO2). In other examples, support structure 24 may be made of a silicon material.

Support structure 24 may include one or more mounting pads, such as mounting pads 29A-29C (collectively, "mounting pads 29"), positioned at various locations on support structure 24. In some examples, mounting pads 29 may be raised such that when accelerometer 2 is fully assembled, mounting pads 29 may contact upper and lower stators 10 and 30 to separate proof mass assembly 20 from upper and lower stators 10 and 30 as well as provide mounting support for proof mass assembly 20. Mounting pads 29 may take on any form or shape and may be present in any quantity. In some examples, the height of mounting pads 29 may define the capacitive gaps between upper and lower stators 10 and 30 and the upper and lower capacitance pick-off plates (e.g., upper capacitance pick-off plate 26) on proof mass 22. In some examples, the height of mounting pads 29 may be between half of one-thousandth to one-thousandth of an inch. In some examples, mounting pads 29 may be on both sides of support structure 24.

In some examples, mounting pads 29 may be configured to help relieve forces and/or strains arising from TEC mismatches between upper and lower stators 10 and 30 and support structure 24 of proof mass assembly 20. For example, mounting pads 29 may be configured to mechanically isolated portions of proof mass assembly 20 from forces and/or strains caused during construction of accelerometer 2 (e.g., through the use of cutaways to mechanically isolate mounting pads 29 from support structure 24). In some examples, mounting pads 29 may provide frictional forces to upper and lower stators 10 and 30 and/or help prevent the stators from shifting or slipping during construction or operation of accelerometer 2. In some examples, mounting pads 29 are made of fused quartz (SiO$_2$. In other examples, mounting pads 29 are made of a silicon material.

In some examples, support structure 24 may also include a plurality of electrical traces 21A-21B (collectively, "electrical traces 21"). In some examples electrical traces 21 may be formed on a single surface of support structure 24 (e.g., upper surface) or on multiple surfaces (e.g., upper, lower, and side surfaces) of support structure 24. Electrical traces 21A and 21B may electrically communicate with respective electrical traces 23A and 23B (collectively, "electrical traces 23) to transmit an electrical signal. In some examples electrical traces 21 may be electrically connected to upper and lower stators 10 and 30 (e.g., via electrical bonding pads or mounting pads 29) to establish electrical connections with other components, including additional circuitry, of accelerometer 2 or to other devices in which accelerometer 2 is installed.

Electrical traces 21 may be formed using any suitable conductive material. In some examples, the composition of electrical traces 21 may be selected to exhibit good thermal expansion coefficient (TEC) compatibility with the base material of support structure 24 as well as demonstrate relatively low electrical resistivity. For example, electrical traces 21 may be formed from a layer of chromium plated with a layer of gold. In such examples, the layer of chromium may provide relatively good adhesion to the base material of support structure 24 (e.g., quartz) while the layer of gold provides low electrical resistivity and a sufficient basis for establishing other electrical connections (e.g., wire bonds). Electrical traces 21 may be formed using any suitable technique. For example, portions of support structure 24 may be masked to define electrical traces 21 followed by deposition of a conductive material using, for example, chemical vapor deposition, physical vapor deposition (e.g., electron beam evaporation or sputtering), or the like.

Mounting pads 29 may be configured to electrically connect components and circuitry of proof mass assembly 20 with other components, including additional circuitry, of accelerometer 2. For example, electrical traces 21A and 21B may be deposited on a portion of mounting pads 29A and 29B, respectively. When upper and lower stators 10 and 30 are mounted to opposite sides of proof mass assembly 20, electrical traces 21 may establish an electrical connection with upper and lower stators 10 and 30 through the contact points on mounting pads 29.

Proof mass assembly 20 also includes proof mass 22, which may include one or more capacitance pick-off plates (e.g., upper capacitance pick-off plate 26) and one or more force-rebalance coils (e.g., upper force-rebalance coil 27) mounted on an upper and/or lower surfaces of proof mass 22. While the disclosure describes the operation of an accelerometer in terms of upper capacitance pick-off plate 26 and upper force-rebalance coil 27, such descriptions may equally apply to the use of a lower capacitance pick-off plate and lower force-rebalance coil, combinations of upper and lower capacitance pick-off plates and lower force-rebalance coils. Other means of measuring the deflection of proof mass 22 due to acceleration are also contemplated by this disclosure.

In some examples, upper capacitance pick-off plate 26 and upper force-rebalance coil 27 may be configured to interact with upper stator 10 to measure the acceleration applied to accelerometer 2. For example, during operation as acceleration is applied to accelerometer 2, proof mass 22 may deflect from a null position causing the capacitance gap between upper capacitance pick-off plate 26 and the inwardly facing surface of upper stator 10 (e.g., top surface 42 of excitation ring 40) to change (e.g., increase or decrease) resulting in a change in a capacitance measurement. In some examples, the change in capacitance may be used to determine the amount of acceleration applied to accelerometer 2. Additionally or alternatively, accelerometer 2 may be configured to apply an electrical current to upper force-rebalancing coil 27 based on the change in capacitance such that upper force-rebalancing coil 27 in conjunction with an magnetic pole piece of upper stator 10 acts as a servo to maintain the position proof mass 22 at a null position. In such examples, the current applied to upper force-rebalancing coil 27 to maintain proof mass 22 at the null is proportional to and may be used to determine the amount of acceleration applied to accelerometer 2.

In some examples, upper force-rebalancing coil 27 may be attached to an upper or lower surface of proof mass 22. Upper force-rebalancing coil 27 may be formed, for example, from of a copper coil and attached to one of the respective surfaces of proof mass 22 using suitable techniques. In some examples, upper force-rebalancing coil 27 may include a coil form (e.g., anodized aluminum form) that provides additional support for the coil. In such examples, the coil form may be mounted directly to the surface of proof mass 22 using, for example, a compliant elastomer. The compliant elastomer may help alleviate possible TEC mismatches between the coil form and base materials of proof mass 22. Upper force-rebalancing coil 27 may be electrically connected to other electronic components of accelerometer 2 through one or more electrical traces (e.g., electrical trace 23B on flexure 28B).

Proof mass 22 also includes upper capacitance pick-off plate 26 formed on the upper surface of proof mass 22. In some examples, upper capacitance pick-off plate 26 may cooperate with the inwardly facing surfaces of upper stator 10 to provide a capacitive pick-off system. Upper capacitance pick-off plate 26 may be electrically connected to other electronic components of accelerometer 2 through one or more electrical traces (e.g., electrical trace 23A on flexure 28A).

Upper capacitance pick-off plate 26 may be formed using any suitable technique. For example, portions of proof mass 22 may be masked to define upper capacitance pick-off plate 26 followed by deposition of a conductive material using, for example, chemical vapor deposition, physical vapor deposition (e.g., electron beam evaporation or sputtering), or the like. In some examples, upper capacitance pick-off plate 26 may include a layer of chromium formed on the surface of proof mass 22 followed by a layer of gold formed on the layer of chromium. In some examples, upper capacitance pick-off plate 26 may be formed simultaneously with electrical traces 21 using the same conductive materials. In other examples, upper capacitance pick-off plate 26 may be formed separately from electrical traces 21 using the same or different conductive materials. While, upper capacitance pick-off plate 26 is depicted as a c-shaped capacitor pick-off plate, it is contemplated that upper capacitance pick-off plate 26 may take the form of any suitable shape configured to measure a capacitance with upper stator 10.

Proof mass 22 may be flexibly connected to support structure 24 using one or more flexures 28. In some examples, flexures 28 may support proof mass 22 within support structure 24 and enable proof mass 22 to move about the plane defined by support structure 24. For example, flexures 28 may be stiff in the radial direction (e.g., in the x-axis and y-axis directions) and flexible in vertical direction (e.g., in z-axis direction), such that flexures 28 allow proof mass 22 to move in a direction substantially orthogonal (e.g., orthogonal or nearly orthogonal) to a plane defined by support structure 24 due to acceleration of accelerometer 2.

Flexures 28 may be formed from any suitable base material. For example, flexures 28 may be made of fused quartz ($SiO_2$. In other examples, flexures 28 may be made of a silicon material. In some examples, flexures 28 may be formed using the same base material as support structure 24 and proof mass 22, such that the three components are formed from a monolithic material (e.g., a single structure). For example, proof mass 22, flexures 28, and support structure 24 may be made from the same silicon material or fused quartz. In such examples, the plurality of features defining proof mass 22, flexures 28, and support structure 24 of proof mass assembly 20 may be etched into the monolithic material using, for example, a carbon-dioxide laser or acid bath to define the base features for proof mass assembly 20. For example, in some examples, the base material for proof mass 22, flexures 28, and support structure 24 may consist essentially of fused quartz or silicon (e.g., made of primarily fused quartz or silicon) in the form a monolithic material. The monolithic material may be covered with a photoresist masking to define the various features of proof mass 22, support structure 24, and flexures 28 and the monolithic material may be exposed to laser light to remove (e.g., vaporize) excess material and form the various structural features proof mass 22, support structure 24, and flexures 28. In some examples, the base features of proof mass assembly 20 may be formed from the monolithic material by masking the monolithic material with a silkscreen vinyl material or a silicon rubber material followed by submersion of the monolithic material in an acid bath to etch away excess materials.

In some examples, flexures 28 may be relatively thin (e.g., thin relative to support structure 24 and proof mass 22) in a direction defining the motion of proof mass 22. In some examples, flexures 28 may define a thickness in a direction substantially orthogonal (e.g., orthogonal or nearly orthogonal) to a plane defined by support structure 24 of about 0.25 to about 1 millimeters, or in imperial units, approximately 0.001 inch to approximately 0.04 inches.

Flexures 28A and 28B may include one or more respective electrical traces 23A and 23B configured to transmit electrical signals across flexures 28 of proof mass assembly 20 and between components on support structure 24 and proof mass 22. In some examples, electrical traces 23 may be formed on a single surface of a respective flexure or flexures 28 (e.g., upper surface) or may be formed on multiple surfaces of flexures 28 (e.g., upper and lower surfaces). Electrical traces 23 may act as an electrical bridge electrically connecting components including circuitry positioned on proof mass 22 (e.g., upper capacitance pick-off plate 26) and other components, including additional circuitry, positioned on support structure 24 (e.g., electrical traces 21). In some examples, electrical traces 23 may be formed using similar materials and techniques as electrical traces 21.

In some examples, upper and lower stators 10 and 30 may be attached to (e.g., clamped) to opposite sides of proof mass assembly 20 using one or more of the respective mounting pads 29. In some examples, upper and lower stators 10 and 30 may be secured to proof mass assembly 20 using a bellyband (not shown). In such examples, the bellyband may be formed from a single metal hoop-like structure that surrounds the exterior of upper and lower stators 10 and 30. The belly band may be fixed to upper and lower stators 10 and 30 using, for example, an epoxy, thereby securing upper and lower stators 10 and 30 after they are clamped to proof mass assembly 20.

In some examples, upper and lower stators 10 and 30 may each include an excitation ring 40, permanent magnet 50, pole piece 60, and air gap 38. In some examples, excitation ring 40 may be generally cylindrical. As shown in more detail in FIG. 3, in some examples, excitation ring 40 may include a generally c-shaped cross section. Excitation ring 40 may include a top surface 42, outer surface 44, bottom surface 46, and inner surface 48. Excitation ring 40 may be made from any suitable material including, for example, invar, super invar, or the like. Invar has a relatively low TEC of about 2 parts-per-million (ppm) per degree centigrade (°

C.), which may improve compatibility aspects between upper and lower stators 10 and 30 and the base materials used to form proof mass assembly 20 (e.g., fused quartz which has a TEC of about 0.55 ppm/° C.). In some examples, the diameter of excitation ring 40 at outer surface 44 may be approximately 875 one-thousandths of an inch (or in metric units, approximately 22.2 mm). In some examples, the diameter of excitation ring 40 at inner surface 48 may be approximately 441 one-thousandths of an inch (approximately 11.2 mm). In some examples, air gap 38 may be approximately 35 one-thousandths of an inch (approximately 0.900 mm). In some examples, the dimensions may have a margin of error of plus or minus one one-thousandth of an inch. It should be understood that the dimensions described herein are merely examples and that other dimensions may be used. It should also be understood that the drawings are not necessarily drawn to scale.

Permanent magnet 50 may include a top surface 52, an outer surface 54, and a bottom surface (not shown in FIG. 1). The bottom surface of permanent magnet 50 may be coupled to excitation ring 40. For example, at least a portion of the bottom surface of permanent magnet 50 may be bonded to excitation ring 40. As illustrated in FIG. 1, permanent magnet may be generally cylindrical. In other examples, permanent magnet may be other shapes. In some examples, the diameter of permanent magnet 50 at outer surface 54 may be approximately 370 one-thousandths of an inch (approximately 9.40 mm).

Pole piece 60 may include a top surface 62, outer surface 64, and bottom surface 66. Pole piece 60 may be coupled to permanent magnet 50. For example, at least a portion of bottom surface 66 of pole piece 60 may be bonded to top surface 52 of permanent magnet 50. Pole piece 60 deflects magnetic flux from permanent magnet 50 so that the magnetic flux travels across air gap 38 into excitation ring 40 and back into permanent magnet 50.

In some examples, pole piece 60 may be symmetric in each of an xy-plane, a yz-plane, and a zx-plane. For purposes of illustration only, an xy-plane is defined by top surface 52 of permanent magnet 50. Other xy-planes may be parallel to the xy-plane defined by top surface 52 of permanent magnet 50. Because pole piece 60 may be symmetric in each of the respective planes, in some examples, pole piece 60 uniformly covers permanent magnet 50. In other words, pole piece 60 may be symmetric in a yz-plane and zx-plane such that pole piece 60 has a uniform thickness and may be symmetric in an xy-plane such that pole piece substantially covers the entire top surface of permanent magnet 50. In such examples, excitation ring 40 may be asymmetric in order to align the center of the magnetic flux produced by permanent magnet 50 with the center of mass of proof mass assembly 20. In some examples, top surface 42 of excitation ring 40 may be lapped in an attempt to make top surface 42 as flat as possible. However, if excitation ring 40 is asymmetric, top surface 42 may not lap evenly such that top surface 42 of excitation ring 40 may not be flat.

In some examples, pole piece 60 may be asymmetric in one or more planes and may cover at least a portion of the top surface 52 of permanent magnet 50. For example, as illustrated in FIG. 1, pole piece 60 may be symmetric in a yz-plane and a zx-plane (e.g., may have a uniform thickness), and may be asymmetric in a particular xy-plane (e.g., an xy-plane parallel to the xy-plane defined by top surface 52 of permanent magnet 50). For instance, as illustrated by FIG. 1, pole piece 60 may have a uniform thickness in a yz-plane and a zx-plane such that pole piece 60 is symmetric in a yz-plane and a zx-plane. In contrast, pole piece 60 may be asymmetric in the particular xy-plane if a plane perpendicular to the particular xy-plane (e.g., a yz-plane or a zx-plane) bisects the particular xy-plane such that a portion of pole piece 60 on a particular side of the bisector does not mirror a portion of pole piece 60 on the opposite side of the bisector. For example, as illustrated in FIG. 1, pole piece 60 may include a round edge along a portion of outer surface 64 and a flat edge along a different portion of outer surface 64. Thus, if a yz-plane bisects the particular xy-plane, pole piece 60 may be asymmetric in the particular xy-plane because a portion of pole piece 60 on one side of the bisector (the yz-plane) includes a round edge along outer surface 64 and a portion of pole piece 60 on the opposite side of the bisector includes a flat edge along outer surface 64.

In some examples, pole piece 60 may be asymmetric such that outer surface 64 of pole piece 60 does not align with the entire outer surface 54 of permanent magnet 50. Outer surface 64 of pole piece 60 may align with outer surface 54 of permanent magnet when outer surface 54 and outer surface 64 are substantially flush or level with one another. In some examples, outer surface 64 of pole piece 60 may include a first outer surface portion 68A aligned with outer surface 54 of permanent magnet 50 and a second outer surface portion 68B that is not aligned with outer surface 54 of permanent magnet 50. For instance, as illustrated in FIG. 1, outer surface 64 of pole piece 60 includes a rounded outer surface 68A that is substantially aligned (e.g., flush or level) with the outer surface 54 of permanent magnet and a flat outer surface 68B that is interior to the outer surface 54 of permanent magnet 50 (in other words, flat outer surface 68B is not aligned (e.g., flush or level) with outer surface 54). While second outer surface portion 68B of pole piece 60 is shown as a flat surface, in some examples, second outer surface may include a curved surface or surface of any other shape.

In some examples, pole piece 60 may cover substantially all of top surface 52 of permanent magnet 50. In other examples, as illustrated in FIG. 1, pole piece 60 may cover only a portion of top surface 52 of permanent magnet 50. For example, pole piece 60 may cover a first region of top surface 52 of permanent magnet 50 and may not cover a second region of the top surface 52 of permanent magnet 50. Thus, as shown in FIG. 1, a portion of top surface 52 of permanent magnet 50 may remain uncovered by pole piece 60.

By including an asymmetric pole piece, the accelerometer may align the center of magnetic flux with the center of mass of proof mass assembly while improving the symmetry of excitation ring 40. If the surface of the excitation ring is more symmetric, lapping the excitation ring may produce a flatter top surface of the excitation ring. Producing a flatter top surface of the excitation ring may reduce the amount of distortion in the proof mass assembly that may occur when the proof mass assembly is clamped to the upper stator and lower stator. Reducing the distortion in the proof mass assembly may reduce the error in the acceleration measurement, thus increasing the accuracy of the accelerometer.

Figure 2A:
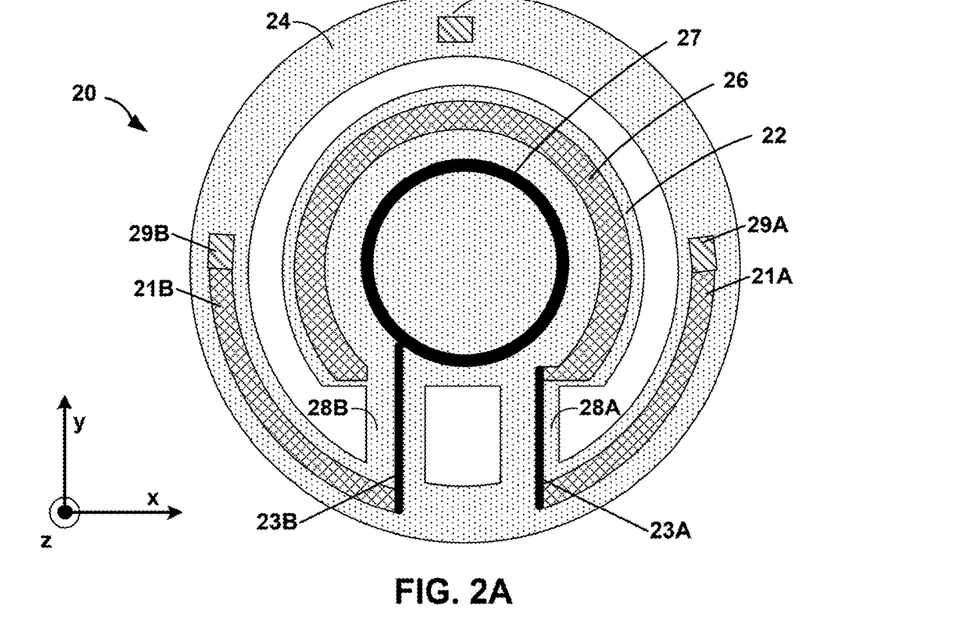
FIG. 2A is a conceptual diagram illustrating a plan-view of an example proof mass assembly, in accordance with one or more aspects of the disclosure.
Figure 2B:
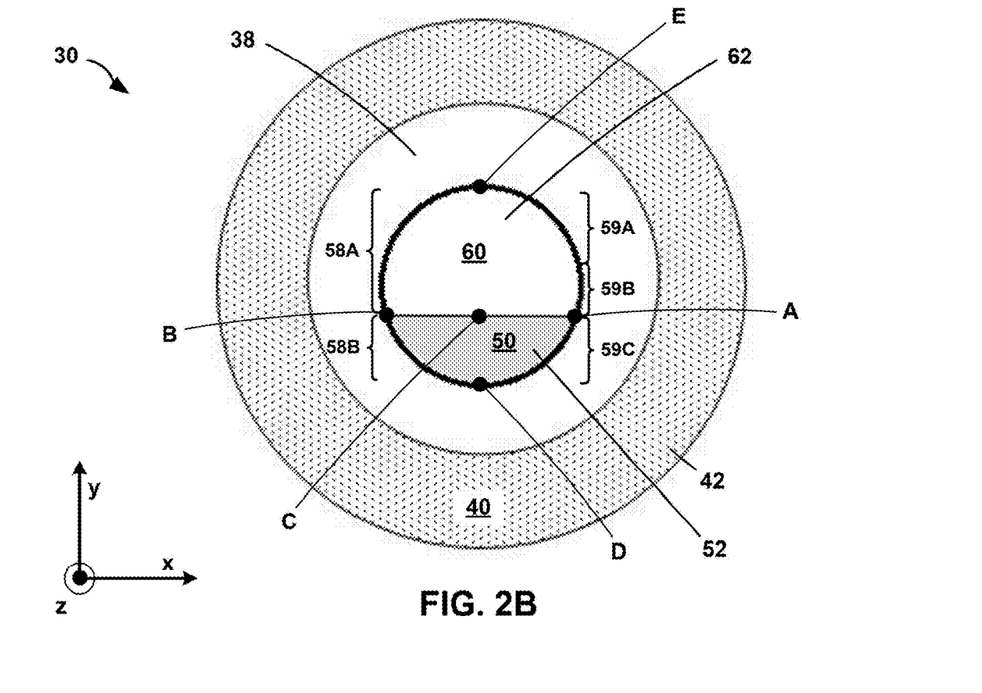
FIG. 2B is a conceptual diagram illustrating a plan-view of an example stator, in accordance with one or more aspects of the disclosure.

FIG. 2A is a conceptual diagram illustrating a plan-view of an example proof mass assembly 20, in accordance with one or more aspects of the disclosure. In some examples, proof mass assembly 20 of FIG. 2A corresponds to proof mass assembly 20 of FIG. 1. FIG. 2B is a conceptual diagram illustrating a plan-view of an example stator, in accordance with one or more aspects of the disclosure. For purposes of illustration only, the stator of FIG. 2B is illustrated as lower stator 30, which may correspond to lower stator 30 of FIG. 1. For example, lower stator 30 may include excitation ring 40, permanent magnet 50, and pole piece 60. However, in some examples, the description of lower stator 30 may also apply to upper stator 10.

In some examples, permanent magnet 50 may include locations A-E. Locations A, B, D, and E may represent locations at the intersection of outer surface 54 and top surface 52 of permanent magnet 50. Similarly, location C may include a location on top surface 52 of permanent magnet 50. It should be understood that locations A-E are merely intended to provide reference points to top surface 52 of permanent magnet 50. In some examples, permanent magnet 50 may include a plurality of regions. For example, permanent magnet may include a first region 58A that is defined by the area enclosed by locations A, B, and E and may include a second region 58B defined by the area enclosed by locations A, B, and D.

Pole piece 60 may be an asymmetric pole piece and may cover at least a portion of top surface 52 of permanent magnet 50. For example, as illustrated in FIG. 2B, pole piece 60 may be asymmetric in an xy-plane parallel to the xy-plane defined by top surface 52 of permanent magnet 50. For instance, pole piece 60 may cover first region 58A of top surface 52 of permanent magnet 50 and may not cover second region 58B of top surface 52 of permanent magnet 50. In some examples, first region 58A of permanent magnet 50 may include a rear region 59A and a middle region 59B of permanent magnet 50 and second region 58B may include a forward region 59C of permanent magnet 50. For example, as illustrated in FIG. 2B, pole piece 60 may cover rear region 59A and middle region 59B of top surface 52A of permanent magnet 50 and may not cover forward region 59C of permanent magnet 50.

In some examples, a boundary between first region 58A and second region 58B may be defined by a line between two points at the intersection of top surface 52 and outer surface 54. For example, a line between location A and location B may define a boundary between first region 58A and second region 58B. It should be understood that locations A and B do not necessarily form a physical boundary between regions 58A and 58B, rather the boundary between first region 58A and second region 58B may be simply used as a reference to regions 58A and 58B of permanent magnet 50. Location C may represent the midpoint of the boundary formed by locations A and B such that a line between locations C and D may define a line that is perpendicular to the boundary defined by locations A and B. In some examples, if the diameter of permanent magnet 50 equals approximately 370 one-thousands of an inch (approximately 9.40 mm), the distance between locations C and D may equal approximately 50 one-thousandths of an inch (approximately 1.27 mm). In some examples, the dimensions may have a margin of error of plus or minus one one-thousandth of an inch.

In other examples, a boundary between first region 58A and second region 58B of permanent magnet 50 may be defined by a curve or other geometry. In some examples, first region 58A may surround second region 58B. For example, second region 58B may include a shape (e.g., a rectangle, oval, or any other geometric shape) surrounded by first region 58A. For instance, pole piece 60 may cover first region 58A and may include a cutout (e.g., an inner portion of pole piece 60 may be removed) such that pole piece 60 does not cover second region 58B of permanent magnet 50. As a result, pole piece 60 may asymmetrically cover permanent magnet 50 in an xy-plane by covering first region 58A of top surface 52 and not covering second region 58B of top surface 52. In some examples, leaving second region 58B of top surface 52 of permanent magnet 50 uncovered by pole piece 60 may cause the center of magnetic flux to shift such that the center of magnetic flux aligns with the center of mass of proof mass assembly 20.

In some examples, second region 58B of top surface 52 of permanent magnet 50 may be proximal to flexures 28 relative to first region 58A. For example, proof mass assembly 20 of FIG. 2A may be stacked on top of lower stator 30 of FIG. 2B in the same orientation as FIGS. 2A and 2B, such that flexures 28 are located approximately above second region 58B or such that flexures 28 are at least closer (in the y-direction) to second region 58B compared to first region 58A. In other words, flexures 28 may be closer (in the y-direction) to forward region 59C compared to rear region 59A of top surface of permanent magnet 50.

Figure 3:
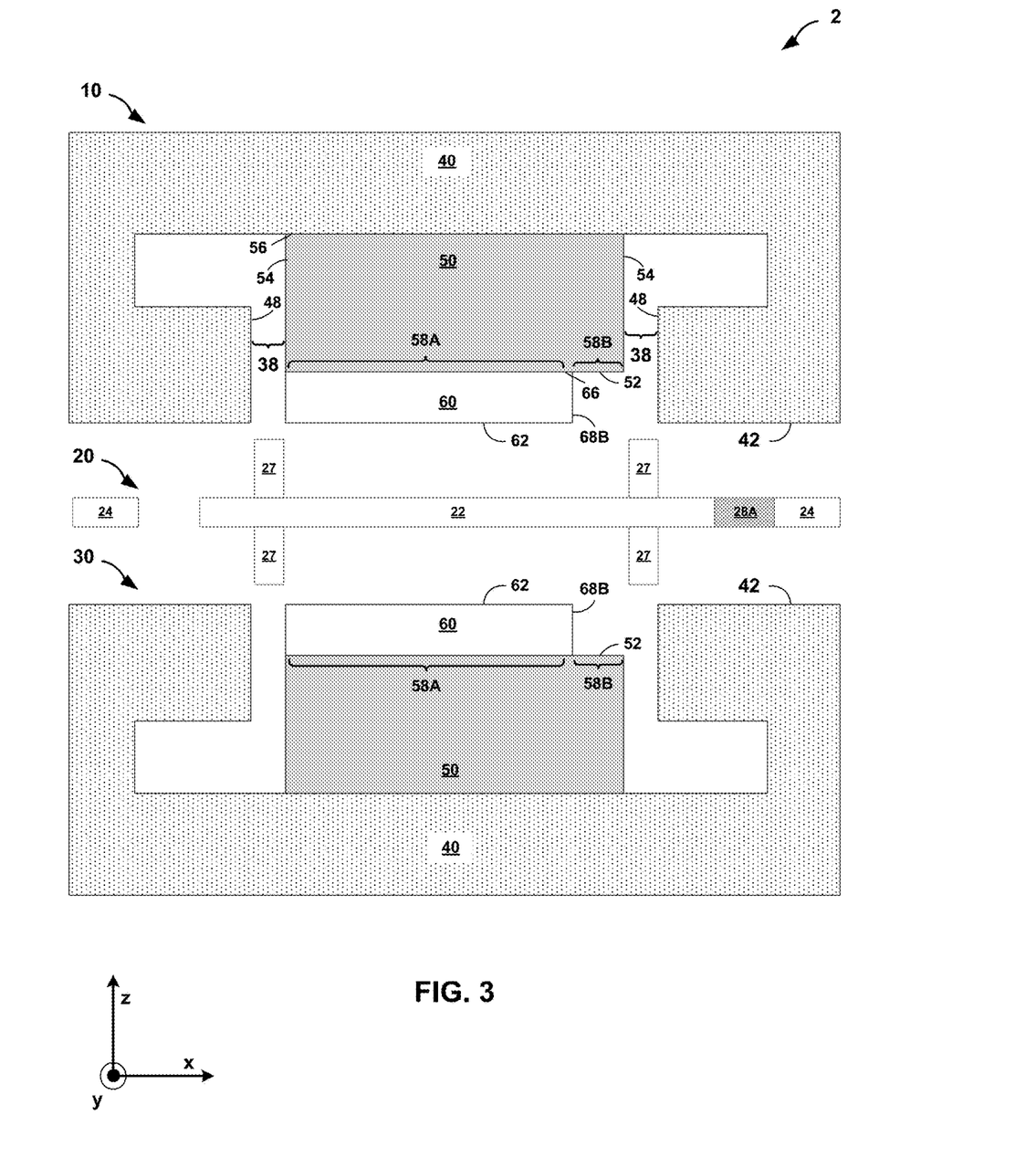
FIG. 3 is a conceptual diagram illustrating a cross-sectional view of an example accelerometer, in accordance with one or more aspects of the disclosure.

FIG. 3 is a conceptual diagram illustrating a cross-sectional view of an example accelerometer 2, in accordance with one or more aspects of the disclosure. As also described above with reference to FIGS. 1 and 2A-2B, accelerometer 2 may include an upper stator 10, proof mass assembly 20, and lower stator 30. Proof mass assembly 20 may include proof mass 22 coupled to support structure 24 via one or more flexures (e.g., flexure 28A). Proof mass assembly 20 may also include upper and lower force-rebalance coils 27.

In some examples, each of upper stator 10 and lower stator 30 may each include excitation ring 40, permanent magnet 50, and pole piece 60. Bottom surface 56 of each permanent magnet 50 may be coupled to a respective excitation ring 40, and each bottom surface 66 of each pole piece 60 may be coupled to a respective top surface 52 of each respective permanent magnet 50.

For ease of illustration only, air gap 38, inner surface 48 of excitation ring 40, outer surface 54 and bottom surface 56 of permanent magnet 50, and bottom surface 66 of pole piece 60 are labeled with respect to upper stator 10 only. However, as illustrated in FIG. 3, upper stator 10 and lower stator 30 may be mirror images of one another, such lower stator 30 also includes air gap 38, inner surface 48 of excitation ring 40, outer surface 54 and bottom surface 56 of permanent magnet 50, and bottom surface 66 of pole piece 60.

Pole piece 60 may cover first region 58A of top surface 52 of permanent magnet 50 and may not cover second region 58B of top surface 52 of permanent magnet 50. In some examples, second region 58B may be proximal to flexures 28 (relative to first region 58A) and first region 58A may be distal to flexures 28 (relative to second region 58B). In other words, pole piece 60 may cover a first region 58A of permanent magnet 50 opposite flexures 28 and a second region 58B of permanent magnet 50 near flexures 28 may remain uncovered by pole piece 60. In some examples, leaving second region 58B of permanent magnet 50 uncovered may enable accelerometer 2 to align the center of magnetic flux with the center of mass of proof mass assembly. For example, proof mass assembly 20 may include relatively less mass proximal to flexures 28 and relatively more mass distal flexures 28, which may cause the center of mass of proof mass assembly to shift towards the distal end of proof mass assembly 20. In some examples, because pole piece 60 covers first region 58A of permanent magnet 50 and does not cover second region 58B of permanent magnet 50, pole piece 60 may cause the center of magnetic flux to shift distal from flexures 28. As a result, the center of magnetic flux may align with the center of mass of proof mass assembly.

Figure 4A:
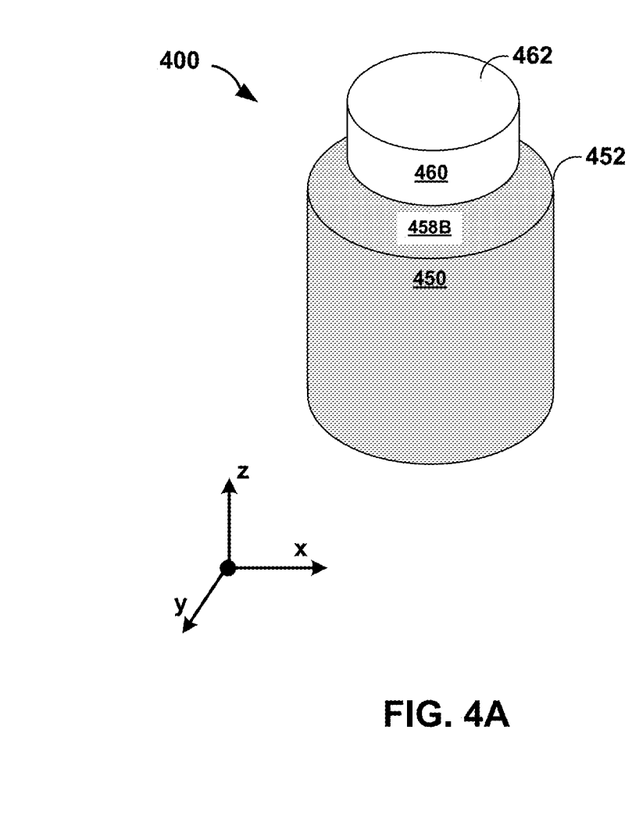
FIGS. 4A-4B are conceptual diagrams illustrating an example magnet assembly, in accordance with one or more aspects of the disclosure.
Figure 4B:
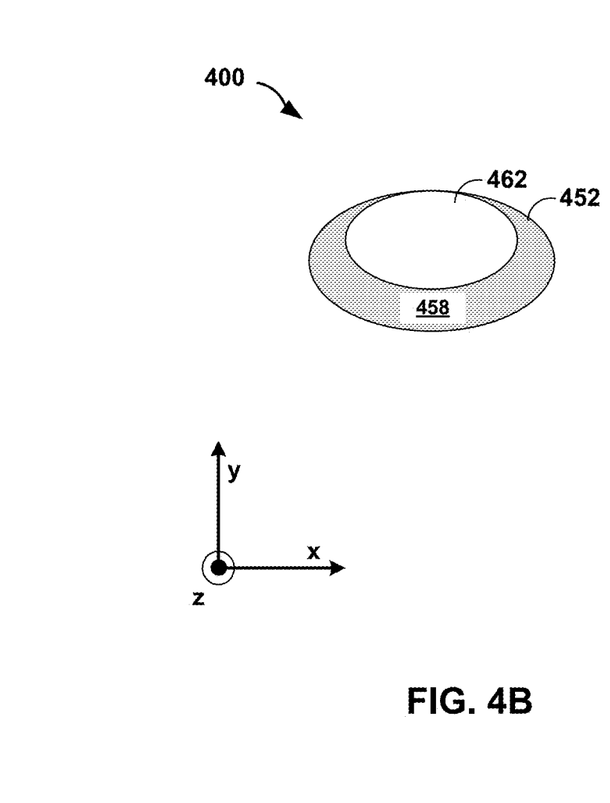

FIGS. 4A-4B are conceptual diagrams illustrating an example magnet assembly 400, in accordance with one or more aspects of the disclosure. FIG. 4A is a conceptual diagram illustrating a side view of an example magnet assembly 400, in accordance with one or more aspects of the disclosure. FIG. 4B is a conceptual diagram illustrating a top view of an example magnet assembly 400, in accordance with one or more aspects of the disclosure.

Magnet assembly 400 may include permanent magnet 450 and pole piece 460, which may respectively correspond to permanent magnet 50 and pole piece 60 of FIGS. 1-3. Permanent magnet 450 may include a top surface 452 and pole piece 460 may include a top surface 462. In some examples, pole piece 460 may be symmetric in an xy-plane, yz-plane, and a zx-plane. In some examples, permanent magnet 450 and pole piece 460 may be the same general shape. For example, as illustrated in FIG. 4A, permanent magnet 450 and pole piece 460 are cylindrical. In some examples, a thickness of pole piece 460 may be substantially uniform. For example, as shown by FIG. 4A, the thickness of pole piece 460 is the same at all portions of pole piece 460. As illustrated in FIGS. 4A-4B, in some examples, pole piece 460 may cover a first region of top surface 452 of permanent magnet 450 and a second region 458B of top surface 452 of permanent magnet may remain uncovered by pole piece 460. For example, second region 458B may be proximal, or nearer, at least one flexure of a proof mass assembly relative to the first region of the top surface 452 of permanent magnet 450. In some examples, because pole piece 460 covers only the first region of permanent magnet 450 and does not cover second region 458B proximal the at least one flexure, the center of magnetic flux may align with the center of mass of a proof mass assembly.

Figure 5A:
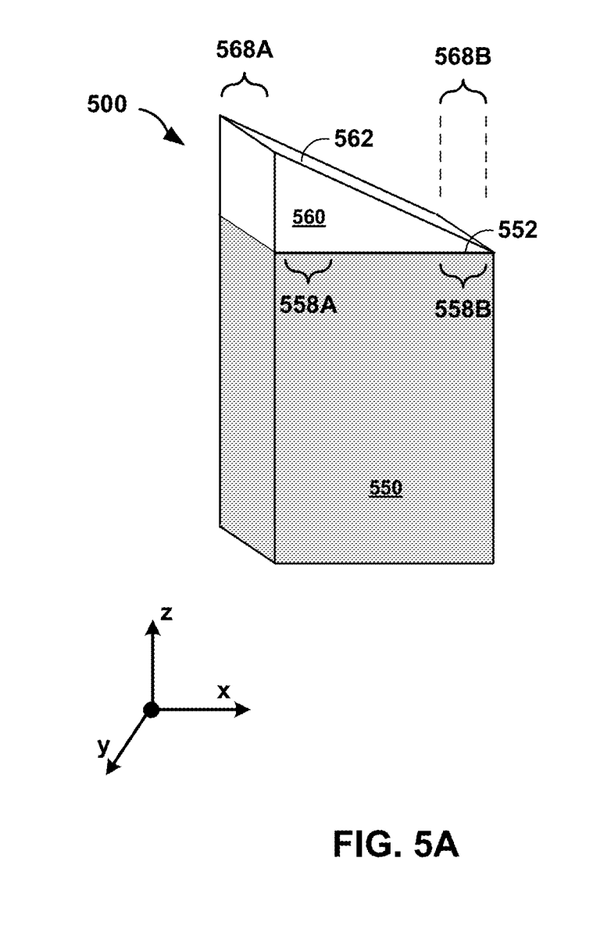
FIGS. 5A-5B are conceptual diagrams illustrating an example magnet assembly, in accordance with one or more aspects of the disclosure.
Figure 5B:
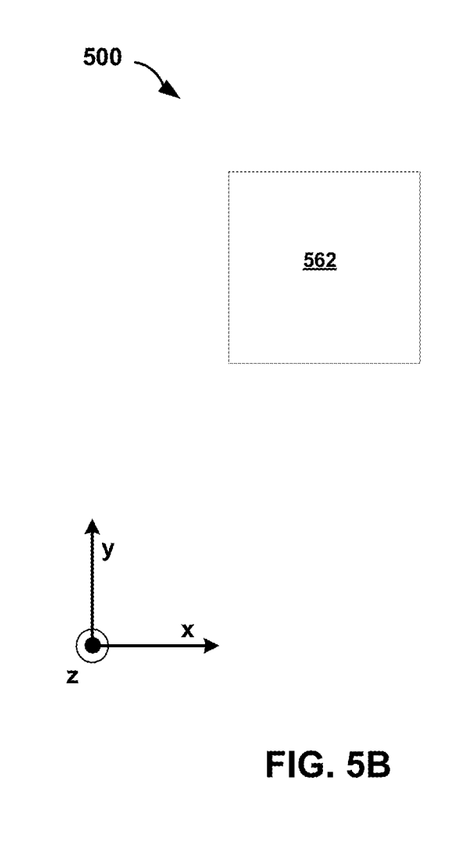

FIGS. 5A-5B are conceptual diagrams illustrating an example magnet assembly 500, in accordance with one or more aspects of the disclosure. FIG. 5A is a conceptual diagram illustrating a side view of an example magnet assembly 500, in accordance with one or more aspects of the disclosure. FIG. 5B is a conceptual diagram illustrating a top view of an example magnet assembly 500, in accordance with one or more aspects of the disclosure.

Magnet assembly 500 may include permanent magnet 550 and pole piece 560, which may respectively correspond to permanent magnet 50 and pole piece 60 of FIGS. 1-3. In some examples, permanent magnet 550 includes top surface 552 and pole piece 560 includes top surface 562. Pole piece 560 may be coupled to top surface 552 of permanent magnet 550.

In some examples, pole piece 560 may be asymmetric in at least one plane. For example, as illustrated in FIG. 5B, pole piece 560 may be symmetric in a yz-plane and a zx-plane and may be asymmetric in an xy-plane. For instance, pole piece 560 may be asymmetric in an xy-plane such that pole piece 560 includes include a first thickness at a first region 568A and a second thickness at a second region 568B. For example, the thickness of first region 568A may be greater than the thickness of second region 568B of pole piece 560. For example, second region 568B may be proximal, or nearer, at least one flexure of a proof mass assembly relative to the first region 568A. In some examples, first region 568A of pole piece 560 may cover first region 558A of permanent magnet 550 and second region 568B of pole piece 560 may cover second region 558B of permanent magnet 550.

In some examples, permanent magnet 550 and pole piece 560 may be different shapes. For example, as illustrated in FIG. 5A, permanent magnet 550 may be a rectangular prism (also referred to as a cuboid) and pole piece 560 may be a triangular prism. In some examples, pole piece 560 may cover substantially the entire top surface 552 of permanent magnet 550. For example, as shown in FIG. 5B, pole piece 560 covers the entire top surface 552 of permanent magnet 550 such that no part of top surface 552 of permanent magnet 550 is visible from the top.

Figure 6:
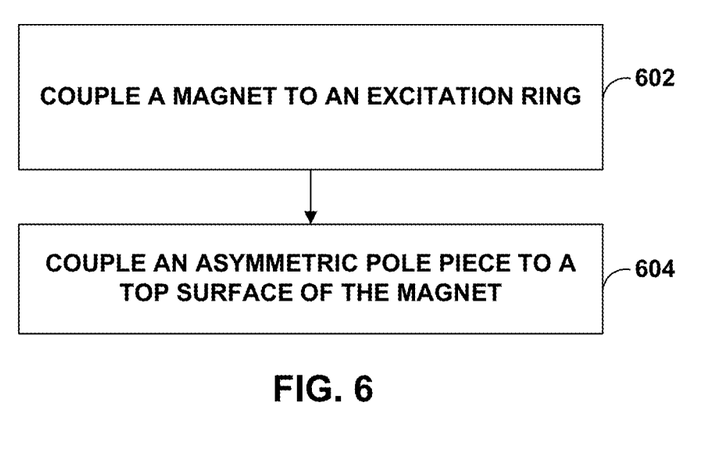
FIG. 6 is a flow diagram illustrating an example technique for forming an example accelerometer, in accordance with one or more aspects of the disclosure.

FIG. 6 is a flow diagram illustrating an example technique for forming an example stator of an accelerometer, in accordance with the disclosure. While the technique shown in FIG. 6 is described with respect to accelerometer 2 of FIGS. 1-3, in other examples, the techniques may be used to form other accelerometers or portions of accelerometers that include different configurations or the accelerometers or portions of accelerometers described herein may be form using other techniques.

In some examples, forming a stator (e.g., upper stator 10 and/or lower stator 30) includes coupling a permanent magnet 50 to an excitation ring 40 (602). For example, at least a portion of the bottom surface of permanent magnet 50 may be bonded to excitation ring 40 via glue, adhesive, epoxy, or the like.

In some examples, forming a stator includes coupling an asymmetric pole piece 60 to a top surface 52 of permanent magnet 50 (604). For example, at least a portion of a bottom surface of pole piece 60 may be bonded to a top surface 52 of permanent magnet 50. In some examples, pole piece 60 may be manufactured to be symmetric in each of an xy-plane, a yz-plane, and a zx-plane. Pole piece 60 may be coupled to top surface 52 of permanent magnet 50 and a portion of pole piece 60 may be removed such that pole piece 60 covers a first region 58A of top surface 52 and does not cover a second region 58B of top surface 52 of permanent magnet 50. In some examples, a portion of pole piece 60 may be removed prior to coupling pole piece 60 to permanent magnet 50, such that when pole piece 60 is coupled to permanent magnet 50, pole piece 60 covers a first region 58A of top surface 52 and does not cover a second region 58B of top surface 52 of permanent magnet 50. In some examples, pole piece 60 may be manufactured to be asymmetric and then may be coupled to at least a portion of top surface 52 of permanent magnet 50.

In some examples, upper stator 10 and lower stator 30 may be coupled to proof mass assembly 20 such that proof mass assembly 20 is positioned between upper stator 10 and lower stator 30. Upper stator 10 and lower stator 30 may be coupled to proof mass assembly 20 such that second region 58B of top surface 52 of permanent magnet 50, which may not covered by asymmetric pole piece 60, may be proximal at least one of flexures 28 of proof mass assembly 20 (relative to first region 58A). In this way, the center of magnetic flux generated by permanent magnets 50 may align with the center of mass of proof mass assembly 20 while top surface 42 of each excitation ring 40 may be flatter than other excitation rings. By using an excitation ring 40 with a flatter top surface 42, upper stator 10 and lower stator 30 are less likely to warp the fused quartz of proof mass assembly 20, which may reduce the bias in the acceleration measurement produced by accelerometer 2.

The techniques of this disclosure may be implemented in a wide variety of computer devices including as part of an integrated circuit (IC) or a set of ICs (e.g., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Moreover, components that have been described above as being separate or discrete may in fact be highly integrated.

Various examples have been described. These and other examples are within the scope of the following claims.

The invention claimed is:

1. An accelerometer comprising:
an upper stator and a lower stator; and
a proof mass assembly disposed between the upper stator and the lower stator, the proof mass assembly comprising a proof mass, a support structure, and at least one flexure coupling the proof mass and the support structure,
wherein at least one of the upper stator or the lower stator comprises:
an excitation ring;
a magnet coupled to the excitation ring, the magnet comprising a top surface and a bottom surface opposite the top surface, the bottom surface of the magnet closer to the excitation ring than to the top surface; and
an asymmetric pole piece coupled to the top surface of the magnet, wherein the asymmetric pole piece is asymmetric about a straight line that passes through a center of the top surface of the magnet and is coplanar with the top surface of the magnet,
wherein the asymmetric pole piece covers a first region of the top surface of the magnet and does not cover a second region of the top surface of the magnet, wherein the second region of the top surface of the magnet is closer to the at least one flexure than the first region of the top surface of the magnet.

2. The accelerometer of claim 1, wherein a thickness of the pole piece is substantially uniform.

3. The accelerometer of claim 1, wherein the first region surrounds the second region.

4. The accelerometer of claim 1, wherein:
a first location is defined by a first intersection of the top surface of the magnet and an outer surface of the magnet;
a second location is defined by a second intersection of the top surface of the magnet and the outer surface of the magnet;
a third location is defined by a third intersection of the top surface of the magnet and the outer surface of the magnet;
a boundary between the first region of the top surface of the magnet and the second region of the top surface of the magnet is defined by a first straight line between the first location and the second location;
the third location on the top surface of the magnet and a midpoint of the first straight line defines a second straight line perpendicular to the first straight line;
a diameter of the magnet is approximately 370 one-thousandths of an inch; and
a distance between the third location and the midpoint of the first straight line is approximately 50 one-thousandths of an inch.

5. The accelerometer of claim 1, wherein a first portion of the asymmetric pole piece is defined by a first thickness and a second portion of the asymmetric pole piece is defined by a second thickness different from the first thickness.

6. The accelerometer of claim 5, wherein:
the second portion of the asymmetric pole piece is closer to the at least one flexure than the first portion of the asymmetric pole piece, and
the first thickness is greater than the second thickness.

7. The accelerometer of claim 1, wherein an inner surface of the at least one of the upper stator or lower stator is substantially cylindrical.

8. A method of constructing an accelerometer, the method comprising:
forming a stator, wherein the stator comprises an excitation ring, a magnet, and an asymmetric pole piece, wherein forming the stator comprises:
coupling a bottom surface of the magnet to the excitation ring;
coupling the asymmetric pole piece to a top surface of the magnet, the top surface opposite the bottom surface, such that the asymmetric pole piece covers a first region of the top surface of the magnet and does not cover a second region of the top surface of the magnet, and such that the asymmetric pole piece is asymmetric about a straight line that passes through a center of the top surface of the magnet and is coplanar with the top surface of the magnet; and
coupling a proof mass assembly to the stator, such that the second region of the top surface of the magnet is closer to at least one flexure of the proof mass assembly than the first region of the top surface of the magnet.

9. The method of claim 8, wherein a thickness of the pole piece is substantially uniform.

10. The method of claim 8, wherein the first region surrounds the second region.

11. The method of claim 8, wherein:
a first location is defined by a first intersection of the top surface of the magnet and an outer surface of the magnet;
a second location is defined by a second intersection of the top surface of the magnet and the outer surface of the magnet;
a third location is defined by a third intersection of the top surface of the magnet and the outer surface of the magnet;
a boundary between the first region of the top surface of the magnet and the second region of the top surface of the magnet is defined by a first straight line between the first location and the second location;
the third location and a midpoint of the first straight line defines a second straight line perpendicular to the first straight line;
a diameter of the magnet is approximately 370 one-thousandths of an inch; and
a distance between the third location and the midpoint of the first straight line is approximately 50 one-thousandths of an inch.

12. The method of claim 8, wherein a first portion of the asymmetric pole piece is defined by a first thickness and a second portion of the asymmetric pole piece is defined by a second thickness different from the first thickness.

13. The method of claim 12, wherein:
the proof mass assembly comprises at least one flexure,
the second portion of the asymmetric pole piece is closer to the at least one flexure than the first portion of the asymmetric pole piece, and
the first thickness is greater than the second thickness.

* * * * *